US012764734B2

(12) United States Patent
Liu et al.

(10) Patent No.: US 12,764,734 B2
(45) Date of Patent: Oct. 13, 2026

(54) SYSTEMS AND METHODS FOR MANAGING FREQUENCY RESOURCE GROUP BASED SERVICE TRANSMISSIONS

(71) Applicant: ZTE CORPORATION, Shenzhen (CN)

(72) Inventors: Xing Liu, Shenzhen (CN); Peng Hao, Shenzhen (CN); Xingguang Wei, Shenzhen (CN); Jing Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 308 days.

(21) Appl. No.: 18/506,238

(22) Filed: Nov. 10, 2023

(65) Prior Publication Data

US 2024/0089952 A1 Mar. 14, 2024

Related U.S. Application Data

(63) Continuation of application No. PCT/CN2021/136704, filed on Dec. 9, 2021.

(51) Int. Cl.
*H04W 72/1263* (2023.01)
*H04W 72/232* (2023.01)

(52) U.S. Cl.
CPC ..... *H04W 72/1263* (2013.01); *H04W 72/232* (2023.01)

(58) Field of Classification Search
CPC ........... H04W 72/1263; H04W 72/232; H04W 72/0453; H04W 72/23
See application file for complete search history.

(56) References Cited

U.S. PATENT DOCUMENTS 10,887,877 B2 * 1/2021 Zhang .................. H04W 72/04
11,412,503 B2 * 8/2022 Chen ..................... H04L 5/0048
(Continued)

FOREIGN PATENT DOCUMENTS

CN 109788560 A 5/2019
CN 111741528 A 10/2020
(Continued)

OTHER PUBLICATIONS

International Search Report and Written Opinion for PCT Appl. No. PCT/CN2021/136704, mailed on Sep. 6, 2022 (6 pages).
(Continued)

*Primary Examiner* — Chandrahas B Patel
(74) *Attorney, Agent, or Firm* — Foley & Lardner LLP

(57) ABSTRACT

Example implementations include determining, by a network for a cell, a plurality of frequency resources and a plurality of frequency resource groups. Each of the plurality of frequency resource groups comprises one or more of the plurality of frequency resources. Each of the plurality of frequency resources is identified by at least one of a first frequency resource index and a second frequency resource index. The first frequency resource index identifies each of the plurality of frequency resources within the cell. The second frequency resource index identifies each of the plurality of frequency resources within one of the plurality of frequency resource groups. The network and the wireless communication device communicate using an active frequency resource group of the plurality of frequency resource groups.

20 Claims, 4 Drawing Sheets

(56) References Cited

U.S. PATENT DOCUMENTS

| | | | | |
|---|---|---|---|---|
| 12,426,099 | B2 * | 9/2025 | Watts | H04W 48/20 |
| 2019/0104543 | A1 | 4/2019 | Park | |
| 2019/0357085 | A1 | 11/2019 | Chervyakov et al. | |
| 2019/0364602 | A1 | 11/2019 | Yi et al. | |
| 2020/0045745 | A1 | 2/2020 | Cirik et al. | |
| 2020/0328867 | A1 | 10/2020 | Shi | |
| 2021/0119745 | A1 | 4/2021 | Li et al. | |
| 2021/0250920 | A1 | 8/2021 | Kim et al. | |
| 2022/0322407 | A1 * | 10/2022 | Sakhnini | H04W 72/535 |
| 2022/0416976 | A1 | 12/2022 | Baek et al. | |
| 2023/0022606 | A1 | 1/2023 | Liu et al. | |
| 2023/0038092 | A1 | 2/2023 | Li et al. | |
| 2023/0179271 | A1 | 6/2023 | Abotabl et al. | |
| 2023/0189234 | A1 | 6/2023 | Hou et al. | |
| 2023/0189235 | A1 | 6/2023 | Zheng et al. | |
| 2023/0189308 | A1 | 6/2023 | Choi et al. | |
| 2023/0239851 | A1 | 7/2023 | Abotabl et al. | |
| 2023/0247588 | A1 | 8/2023 | Liu et al. | |
| 2023/0247627 | A1 | 8/2023 | Choi et al. | |
| 2023/0262673 | A1 | 8/2023 | Xuan et al. | |
| 2023/0318896 | A1 | 10/2023 | Fu et al. | |
| 2024/0064722 | A1 | 2/2024 | Hou et al. | |
| 2024/0291608 | A1 | 8/2024 | Jiang et al. | |
| 2024/0292446 | A1 | 8/2024 | Zhang | |
| 2024/0298342 | A1 | 9/2024 | Jiang et al. | |

FOREIGN PATENT DOCUMENTS

| | | | |
|---|---|---|---|
| CN | 112351500 | A | 2/2021 |
| EP | 3 573 406 | A1 | 11/2019 |
| EP | 3 716 716 | A1 | 9/2020 |
| WO | WO-2018/084544 | A1 | 5/2018 |
| WO | WO-2023/011255 | A1 | 2/2023 |

OTHER PUBLICATIONS

ZTE, "Consideration on potential further enhancement for MBS", 3GPP TSG RAN WG1 #106b-e, R1-2108854, Oct. 19, 2021, e-Meeting (6 pages).

Ericsson, "Mechanisms to support MBS group scheduling for RRC_CONNECTED UEs," 3GPP TSG-RAN WG1 Meeting #104bis-e; R1-2103738; Apr. 12-20, 2021; e-Meeting (24 pages).

Extended European Search Report for EP Appl. No. 21966732.6, dated Mar. 3, 2025 (10 pages).

International Search Report and Written Opinion for PCT Appl. No. PCT/CN2021/136728, mailed on Sep. 8, 2022 (7 pages).

International Search Report and Written Opinion for PCT Appl. No. PCT/CN2021/136800, mailed on Sep. 7, 2022 (8 pages).

International Search Report and Written Opinion on PCT/CN2021/136710 dated Sep. 7, 2022 (8 pages).

ZTE, "Consideration on potential further enhancement for MBS," 3GPP TSG RAN WG1 #106-e; R1-2106748; Aug. 16-27, 2021; e-Meeting (5 pages).

ZTE, "Consideration on potential further enhancement for MBS," 3GPP TSG RAN WG1 #106b-e; R1-2108854; Oct. 11-19, 2021; e-Meeting (6 pages).

ZTE, "Consideration on potential further enhancement for MBS," 3GPP TSG RAN WG1 #107-e; R1-2110913; Nov. 11-19, 2021; e-Meeting (6 pages).

ZTE, et al., "Discussion on MBS Enhancement in Rel-18," 3GPP TSG RAN Meeting #93-e; RP-212392; Sep. 13-17, 2021; Electronic Meeting (13 pages).

Non-Final Office Action on U.S. Appl. No. 18/517,645 DTD Dec. 31, 2025.

Notice of Allowance on U.S. Appl. No. 18/521,748 DTD Jan. 7, 2026.

Notice of Allowance on U.S. Appl. No. 18/517,645 dated Apr. 6, 2026 (8 pages).

* cited by examiner

400

| BWP Group Index | First BWP Index |
|---|---|
| 1 | BWP#1、BWP#2 |
| 2 | BWP#1、BWP#3 |
| 3 | BWP#4 |
| 4 | BWP#3、BWP#4 |

FIG. 4

500

| BWP Group Index | First BWP Index | Second BWP Index |
|---|---|---|
| 1 | BWP#1 | BWP#1-1 |
| | BWP#2 | BWP#1-2 |
| 2 | BWP#1 | BWP#2-1 |
| | BWP#3 | BWP#2-2 |
| 3 | BWP#4 | BWP#3-1 |
| 4 | BWP#3 | BWP#4-1 |
| | BWP#4 | BWP#4-2 |

FIG. 5

SYSTEMS AND METHODS FOR MANAGING FREQUENCY RESOURCE GROUP BASED SERVICE TRANSMISSIONS

CROSS-REFERENCE TO RELATED APPLICATIONS

This application claims the benefit of priority under 35 U.S.C. § 120 as a continuation of International Patent Application No. PCT/CN2021/136704, filed on Dec. 9, 2021, the disclosure of which is incorporated herein by reference in its entirety.

TECHNICAL FIELD

The present implementations relate generally to wireless communications, and more particularly to systems, methods, apparatuses, and non-transitory computer-readable media for managing frequency resource group based service transmissions.

BACKGROUND

Currently, the first phase standardization of the 5th Generation mobile communication technology (5G) has already completed. A series of unicast and multicast features had been specified in the first three New Radio (NR) releases, Rel-15, Rel-16 and Rel-17. Future releases relate to receiving multiple transmission services at the same time.

SUMMARY

In some arrangements, the network determines for a cell a plurality of frequency resources and a plurality of frequency resource groups. Each of the plurality of frequency resource groups comprises one or more of the plurality of frequency resources. Each of the plurality of frequency resources is identified by at least one of a first frequency resource index and a second frequency resource index. The first frequency resource index identifies each of the plurality of frequency resources within the cell. The second frequency resource index identifies each of the plurality of frequency resources within one of the plurality of frequency resource groups. The network and the wireless communication device communicate using an active frequency resource group of the plurality of frequency resource groups.

In some arrangements, a wireless communication device communicates with a network of a cell using an active frequency resource group of a plurality of frequency resource groups. Each of the plurality of frequency resource groups comprises one or more of a plurality of frequency resources. Each of the plurality of frequency resources is identified by at least one of a first frequency resource index and a second frequency resource index. The first frequency resource index identifies each of the plurality of frequency resources within the cell. The second frequency resource index identifies each of the plurality of frequency resources within one of the plurality of frequency resource groups.

The above and other aspects and their implementations are described in greater detail in the drawings, the descriptions, and the claims.

BRIEF DESCRIPTION OF THE DRAWINGS

These and other aspects and features of the present implementations is apparent to those ordinarily skilled in the art upon review of the following description of specific implementations in conjunction with the accompanying figures, wherein:

FIG. 4 is a table illustrating an example of configured relationships between Bandwidth Part (BWP) groups and BWPs of a cell, according to various arrangements.

FIG. 5 is a table illustrating an example of configured relationships between BWP groups and BWPs of a cell including the first and second BWP indices, according to various arrangements.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations is described, and detailed descriptions of other portions of such known components is omitted so as not to obscure the present implementations. Implementations described as being implemented in software should not be limited thereto, but can include implementations implemented in hardware, or combinations of software and hardware, and vice-versa, as is apparent to those skilled in the art, unless otherwise specified herein. In the present specification, an implementation showing a singular component should not be considered limiting. Rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In some arrangements, a User Equipment (UE) may receive Multicast Broadcast Services (MBSs) and unicast services may receive simultaneously in a cell. Under full duplex or flexible duplex, a UE is can receive and transmit signals simultaneously or switch between reception and transmission without delay. In multi-band-one-cell/carrier settings, a UE receive or send signals in different bands/ carriers which belong to a single cell. In these scenarios, multiple services need to be transmitted in parallel in the same cell, to the present arrangements relate to systems, methods, apparatuses, and non-transitory processor-readable media for coordinating or configuring concurrent services.

Figure 1:
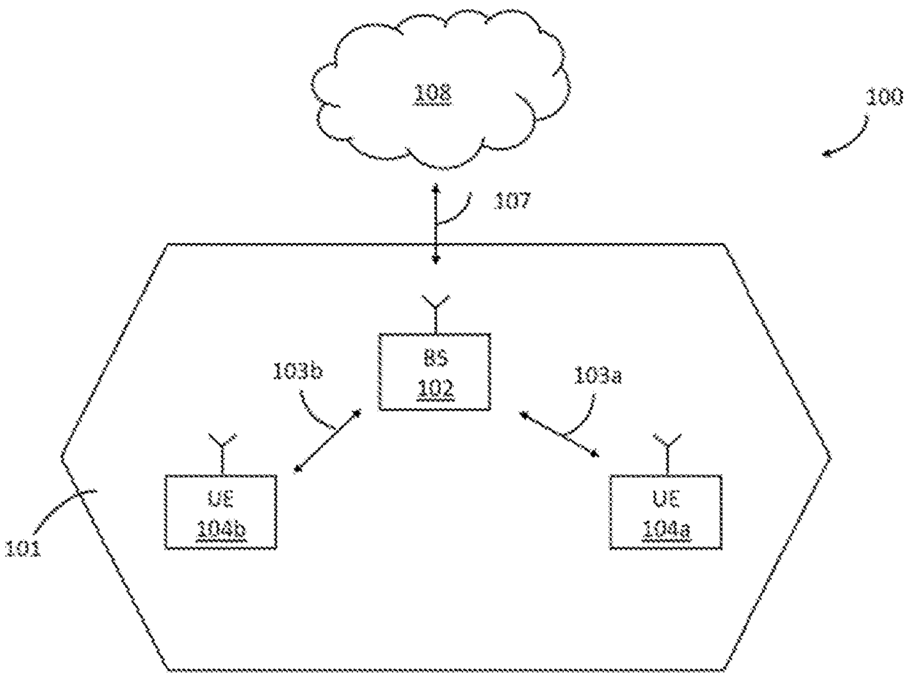
FIG. 1 is a diagram illustrating an example wireless communication network, according to various arrangements.

FIG. 1 shows an example wireless communication network 100. The wireless communication network 100 corresponds to a group communication within a cellular network. In the wireless communication network 100, a network-side communication node or a base station (BS) can include one or more of a next Generation Node B (gNB), an E-Utran Node B (also known as Evolved Node B, eNodeB or eNB), a pico station, a femto station, a Transmission/Reception Point (TRP), an Access Point (AP), or the like. A terminal-side node or a UE can include a long range communication system (such as but not limited to, a mobile device, a smart phone, a Personal Digital Assistant (PDA), a tablet, a laptop computer) or a short range communication system (such as but not limited to, a wearable device, a vehicle with a vehicular communication system, or the like). As in FIG. 1, a network-side communication node is represented by a BS 102, and a terminal-side communication node is represented by a UE 104*a* or 104*b*. In some arrangements, the BS 102 is sometimes referred to as a "wireless communication node," and the UE 104*a*/104*b* is sometimes referred to as a "wireless communication device."

As shown in FIG. 1, the BS 102 can provide wireless communication services to the UEs 104*a* and 104*b* within a cell 101. The UE 104*a* can communicate with the BS 102 via a communication channel 103*a*. Similarly, the UE 104*b* can communicate with the BS 102 via a communication channel 103*b*. The communication channels (e.g., 103*a* and 103*b*) can be through interfaces such as but not limited to, an Uu interface which is also known as Universal Mobile Telecommunication System (UMTS) air interface. The BS 102 is connected to a Core Network (CN) 108 through an external interface 107, e.g., an Iu interface.

Figure 2:
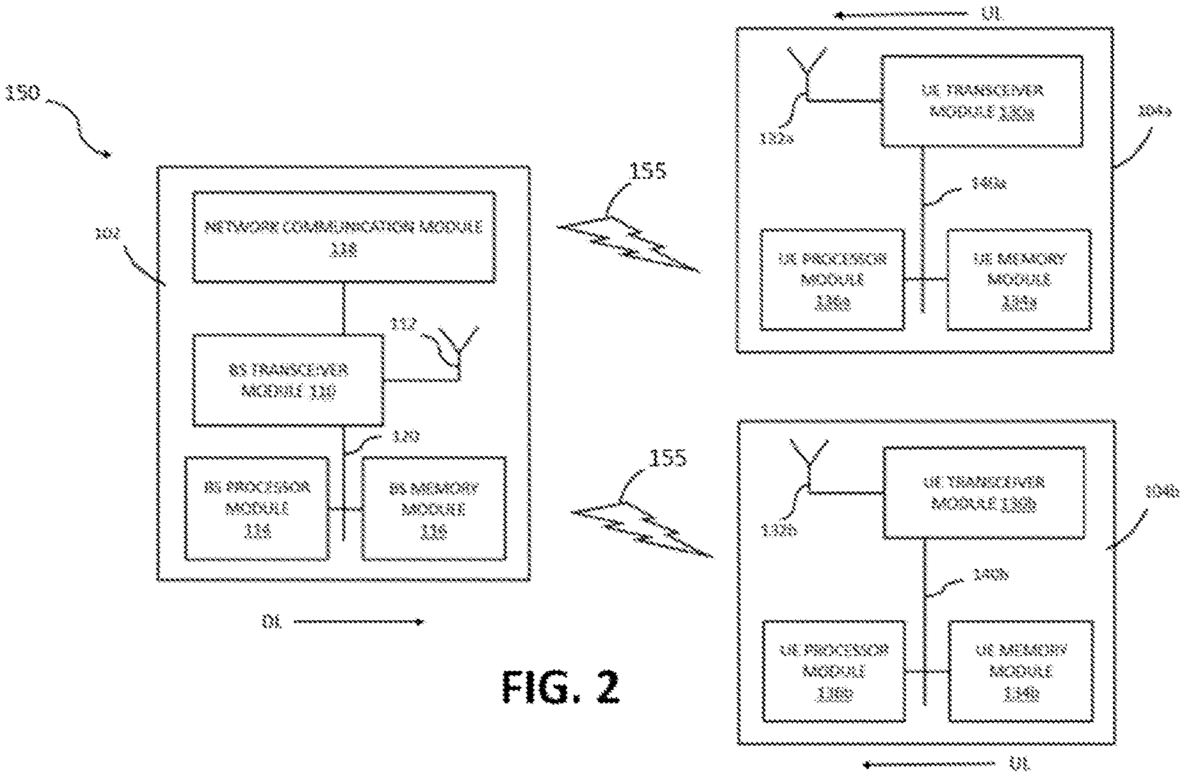
FIG. 2 is a diagram illustrating a block diagram of an example wireless communication system for transmitting and receiving downlink and uplink communication signals, according to various arrangements.

FIG. 2 illustrates a block diagram of an example wireless communication system 150 for transmitting and receiving downlink and uplink communication signals, in accordance with some arrangements of the present disclosure. Referring to FIGS. 1 and 2, the system 150 is a portion of the network 100. In the system 150, data symbols can be transmitted and received in a wireless communication environment such as the wireless communication network 100 of FIG. 1.

The system 150 generally includes the BS 102 and UEs 104*a* and 104*b*. The BS 102 includes a BS transceiver module 110, a BS antenna 112, a BS memory module 116, a BS processor module 114, and a network communication module 118. The modules/components are coupled and interconnected with one another as needed via a data communication bus 120. The UE 104*a* includes a UE transceiver module 130*a*, a UE antenna 132*a*, a UE memory module 134*a*, and a UE processor module 136*a*. The modules/components are coupled and interconnected with one another as needed via a data communication bus 140*a*. Similarly, the UE 104*b* includes a UE transceiver module 130*b*, a UE antenna 132*b*, a UE memory module 134*b*, and a UE processor module 136*b*. The modules/components are coupled and interconnected with one another as needed via a data communication bus 140*b*. The BS 102 communicates with the UEs 104*a* and 104*b* via communication channels 155, which can be any wireless channel or other medium known in the art suitable for transmission of data as described herein.

The system 150 can further include any number of modules/elements other than the modules/elements shown in FIG. 2. The various illustrative blocks, modules, elements, circuits, and processing logic described in connection with the arrangements disclosed herein can be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionalities. Whether such functionalities are implemented as hardware, firmware, or software depends upon the particular application and design constraints imposed on the overall system. Those familiar with the concepts described herein may implement such functionalities in a suitable manner for each particular application, but such implementation decisions should not be interpreted as limiting the scope of the present disclosure.

A wireless transmission from an antenna of each of the UEs 104*a* and 104*b* to an antenna of the BS 102 is known as an uplink transmission, and a wireless transmission from an antenna of the BS 102 to an antenna of each of the UEs 104*a* and 104*b* is known as a downlink transmission. In accordance with some arrangements, each of the UE transceiver modules 130*a* and 130*b* may be referred to herein as an uplink transceiver, or UE transceiver. The uplink transceiver can include a transmitter circuitry and receiver circuitry that are each coupled to the respective antenna 132*a* and 132*b*. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter circuitry and receiver circuitry that are each coupled to the antenna 112. A downlink duplex switch may alternatively couple the downlink transmitter or receiver to the antenna 112 in time duplex fashion. The operations of the transceivers 110, 130*a*, and 130*b* are coordinated in time such that the uplink receiver is coupled to the antenna 132*a* and 132*b* for reception of transmissions over the wireless communication channels 155 at the same time that the downlink transmitter is coupled to the antenna 112. In some arrangements, the UEs 104*a* and 104*b* can use the UE transceivers 130*a* and 130*b* through the respective antennas 132*a* and 132*b* to communicate with the BS 102 via the wireless communication channels 155. The wireless communication channel 155 can be any wireless channel or other medium suitable for downlink (DL) and/or uplink (UL) transmission of data as described herein.

The UE transceiver 130*a*/130*b* and the BS transceiver 110 are configured to communicate via the wireless data communication channel 155, and cooperate with a suitably configured antenna arrangement that can support a particular wireless communication protocol and modulation scheme. In some arrangements, the UE transceiver 130*a*/130*b* and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130*a*/130*b* and the BS transceiver 110 may be configured to support alternate, or additional, wireless data communication protocols, including future standards or variations thereof.

The processor modules 136*a* and 136*b* and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, methods or algorithms described in connection with the arrangements disclosed herein may be embodied directly in hardware, in firmware, in a software module executed by processor modules 114, 136*a*, and 136*b*, respectively, or in any practical combination thereof. The memory modules 116, 134*a*, 134*b* can be realized as RAM memory, flash memory, ROM memory, EPROM memory, EEPROM memory, registers, a hard disk, a removable disk, a CD-ROM, or another suitable form of storage medium. In this regard, the memory modules 116, 134*a*, and 134*b* may be coupled to the processor modules 114, 136*a*, and 136*b*, respectively, such that the processors modules 114, 136*a*, and 136*b* can read information from, and write information to, the memory modules 116, 134*a*, and 134*b*, respectively. The memory modules 116, 134*a*, and 134*b* may also be integrated into their respective processor modules 114, 136*a*, and 136*b*. In some arrangements, the memory modules 116, 134*a*, and 134*b* may each include a cache memory for storing temporary variables or other intermediate information during execution of instructions to be executed by processor modules 114, 136*a*, and 136*b*, respectively. Memory modules 116, 134*a*, and 134*b* may also each include non-volatile memory for storing instructions to be executed by the processor modules 114, 136*a*, and 136*b*, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BS s or core network over a wired or wireless connection.

The BS 102 can communicate with a plurality of UEs (including the UEs 104*a* and 104*b*) using multicast or broadcast, collectively referred to as MBS. The plurality of UEs can each receive MBS channel (e.g., MBS PDSCH, MBS PDCCH, and so on) via multicast and/or broadcast. In order to receive the MBS channel, the plurality of UEs have a common understanding on the configurations of the MBS channel, including but not limited to, frequency resource range for resource allocation, scrambling sequence, and so on.

More specifically, R17 MBS restricts the multicast transmission from using the same numerology as the unicast. Therefore, the Common Frequency Domain (CFR) within the dedicated unicast Bandwidth Part (BWP) of a UE is defined for the MBS transmission to allow unicast and multicast to be received simultaneously. In this case, the Physical Downlink Control Channel (PDCCH) and Physical Downlink Shared Channel (PDSCH) for the MBS are configured independently from that of the unicast, while the MBS BWP and the4 unicast BWP share the Sub-Carrier Spacing (SCS)/Cyclic Prefix (CP) parameters. For R18, System Frame Number (SFN)-based MBS transmissions are supported. Therefore, regardless of whether a new SCS is introduced for the MBS transmission or defined as Extended Cyclic Prefix (ECP) (e.g., 15 kHz ECP), the SCS of SFN-based MBS transmission may be less than that of the unicast. For example, the SCS for unicast is 30 kHz while the SCS for MBS is 15 kHz. Then, the configuration of the numerology (including, SCS, CP type, etc) cannot be shared any more. In addition, given that the data transmission in the BWP can be configured with only the same SCS and CP, CFR is no longer applicable for MBS transmissions with SCS/CP that is different with that for the unicast.

Figure 3:
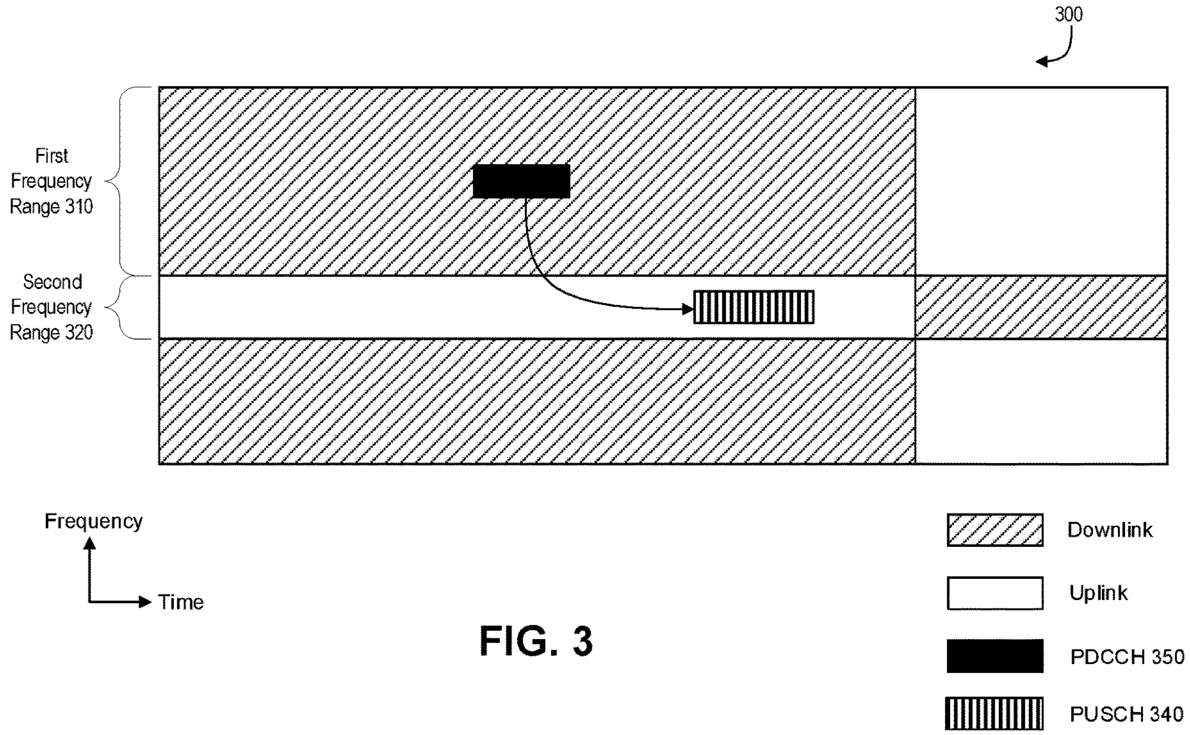
FIG. 3 is a diagram illustrating the manner in which different frequency ranges (e.g., first frequency range and second frequency range) within a carrier are configured with different downlink uplink frame structures, according to various arrangements.

In another example scenario, flexible duplex or full duplex is proposed to reduce the uplink and downlink conversion delay. In this scenario, UEs receive and transmit signals simultaneously or switch between reception and transmission without delay. FIG. 3 is a diagram illustrating the manner in which different frequency ranges (e.g., first frequency range 310 and second frequency range 320) within a carrier 300 are configured with different downlink uplink frame structures, according to various arrangements. Referring to FIGS. 1-3, the frequency range 310 and the frequency range 320 are configured with a complementary structure. For example, downlink resource in the time domain for the first frequency range 310 corresponds to uplink resource in the time domain for the second frequency range 320, and uplink resource in time domain for the first frequency range 310 corresponds to downlink resource in the time domain for the second frequency range 320. In scheduling an uplink transmission (e.g., a PUSCH 340) using PDCCH 350, the base station can select any uplink slot in either the first frequency range 310 or the second frequency range 320 for the PUSCH 340. This allows the uplink scheduling delay to be saved, and the UE can operate in both frequency ranges simultaneously.

In the multi-bands-single-cell scenario, a cell is defined as a set of frequency resources that span multiple bands/carriers. Transmissions on different bands/carriers within one cell can be performed at the same time. A total number of transmissions that can be received or transmitted simultaneously by a UE is the UE capability of the UE. If the UE can support reception or transmission on multiple bands/carriers, no switching is needed. On the other hand, if the UE can support only one band, dynamically switching among different bands/carriers within a cell is used.

In such scenarios, multiple services need to be transmitted in parallel in the same cell or carrier. The present arrangements relate to coordinating and configuring these concurrent services.

Due to factors such as terminal cost, power consumption, and cell coverage, the base station can configure multiple sets of BWPs for UE on one carrier. For example, at most four sets of BWPs can be configured for a UE per cell. At the same time, the UE in an existing system activates only one set of BWPs and uses this set for data reception and transmission. Each set of BWPs includes at least one of an uplink BWP and a downlink BWP. That is, the BWPs allocated by the base station to the UE can be paired. If the downlink BWP resource of a UE is released or deactivated by the base station, the uplink BWP corresponding to the downlink BWP is also released or deactivated.

In some scenarios, if multiple concurrent transmissions are limited to one activated BWP, service transmission is greatly restricted. If different transmissions are configured in different BWPs, switching between different service transmissions is implemented through BWP switching, which introduces 1-3 ms switching delay. Frequent switching is unacceptable as it degrades user experience. Various arrangements to allow multiple BWPs to be activated simultaneously.

As referred to herein, a BWP is used as a general example of a frequency resource of a cell. It should be noted that other forms of frequency resources of a cell, e.g., subband, Common Frequency Resource (CFR), frequency band, etc., can be similarly implemented.

In some arrangements, multiple frequency resources which can be activated simultaneously are configured.

In some examples, a list of BWPs are configured for a given cell by a base station associated with the cell. The configuration parameters of each BWP include at least one of BWP index within a cell, numerology, frequency position and bandwidth, PDCCH reception/monitoring configuration (e.g., search space set, CORESET, etc), PDSCH reception configuration (e.g., TDRA table, etc), SPS configuration, and so on. The BWP index is numbered within the scope of a given cell and can be referred to as a first BWP index. In other words, the first BWP index distinguishes the BWPs within the same cell.

In some examples, a list of BWP groups for the given cell is further configured by the base station associated with the cell. The list of BWP groups include the relationship between each BWP group and the BWP belonging to the BWP group. Each BWP group has a BWP group index. More specifically, each BWP group includes one or more BWPs. The BWPs within a BWP group can be activated simultaneously. In some arrangements, a BWP can map to two or more BWP groups. In some arrangements, the upper limit (the maximum number) of the number of BWPs contained in a given BWP group can be defined in the specification or related with UE capability or configured via signaling, e.g., Radio Resource Control (RRC) signaling, Media Access Control (MAC) layer signaling (e.g., MAC Control Element (CE)), and so on.

FIG. 4 is a table 400 illustrating an example of configured relationships between BWP groups and BWPs of a cell, according to various arrangements. As shown in the table 400, the base station of the cell defines and configures four BWPs with BWP indices #1-#4 for the cell. The base station also defines and configures four BWP groups with BWP group indices 1-4. As shown, BWP group 1 contains BWP #1 and BWP #2. BWP group 2 contains BWP #1 and BWP #3. BWP group 3 contains only BWP #4. BWP group 4 contains BWP #3 and BWP #4.

In some arrangements, the BWPs of the cell further includes an Initial BWP which has an index 0. The Initial BWP belongs to a BWP group identified by BWP group index 0. The BWP group index 0 can also be one of the configured BWP groups of the cell, or the BWP group 0 is an additional BWP group other than the configured BWP groups.

In some arrangements, each BWP also has an BWP index within a given BWP group. FIG. 5 is a table 500 illustrating an example of configured relationships between BWP groups and BWPs of a cell including the first and second BWP indices, according to various arrangements. As shown in the table 500, there are two BWPs (e.g., BWP #3 and BWP #4) in one BWP group (e.g., BWP group 4), the BWP index within the BWP group is further configured or defined as BWP #4-1 and BWP #4-2. The BWP index within the BWP group is numbered or assigned within the scope of the BWP group. That is, the BWP index within the BWP group distinguishes BWPs within the same BWP group. The BWP index within the BWP group can also be referred to as the second BWP index, which is different than the first BWP index.

The second BWP indices for a same BWP are different in different BWP groups. For example, for the BWP with the first BWP index #1, the second BWP index for the same BWP is BWP #1-1 in BWP group 1, and the second BWP index for that BWP is BWP #2-1 in BWP group 2.

In some examples, if there is only one BWP in a given BWP group, the second BWP index of this BWP can also be omitted.

Therefore, the base station can configure multiple BWPs that can be activated at the same time based on at least one of the first BWP indices and the second BWP indices. BWP groups can be configured effectively, providing the foundation for enabling multiple BWPs to be activated at the same time.

Some arrangements relate to dynamic switching among different frequency resources (e.g., different BWP groups) within the same cell.

In some arrangements, a BWP group indicator field is included in Downlink Control Information (DCI) format. The BWP group indicator field is used to indicate BWP group switching. That is, one or more values in the BWP group indicator field indicate that a BWP group is switched from the currently active BWP group to an indicated BWP group.

In some examples, one or more values in the BWP group indicator field of the DCI indicates a BWP group, where the indicated BWP group is not currently activated. The currently active BWP group is switched to the indicated BWP group by the network (e.g., the base station) and the UE. In an example the currently active BWP group is BWP group 1, which includes BWP #1 and BWP #2 which are both currently active. The base station transmits to the UE a DCI on one of the active BWPs with one or more values of the BWP group indicator field indicating BWP group 2 (including BWP #1 and BWP #3). Then, the active BWP group will switch from BWP group 1 to BWP group 3. In other words, the active BWPs will switch from {BWP #1, BWP #2} to {BWP #1, BWP #3}. The BWP group 3 is activated by the UE and the BS in response to receiving or sending the DCI.

In some situations, the BWP group switching may cause delay. The length of the delay can be specified in the protocol or specification. The transmissions (e.g., uplink and downlink communications) between the base station and the UE are paused within the BWP group switching delay period.

In some arrangements, the transmissions on the currently active BWP group (including both BWP #1 and BWP #2) are stopped or canceled before the switching operations are initiated. The switching operations include stopping receiving RF signals on the active BWPs of the currently active BWP group and starting to receive RF signals on BWPs of the indicated BWP group. Transmissions on the indicated BWP group (including both BWP #1 and BWP #3) start after the switching operations are completed.

In some arrangements, there is no switching delay for the BWP that is included in both the currently active BWP group and the indicated BWP group. For example, BWP #1 is included in both of the currently active BWP group 1 and the indicated BWP group 2 as shown in FIG. 5. Accordingly, the transmission on BWP #1 is not affected by switching from BWP group 1 to BWP group 2.

In some examples, the BWP group indicator field is included in a DCI format, which is used for the scheduling of PDSCH in one downlink cell or scheduling of PUSCH in one uplink cell. If the BWP group indicator field indicates switching the active BWP group, the data scheduled by the DCI format will be transmitted in the indicated BWP group instead of the currently active BWP group.

For example, the data can be transmitted and received on a default BWP within the indicated BWP group. In some arrangements, the default BWP for each BWP group is configured via signaling (e.g., RRC signaling, MAC layer signaling, and so on). In other arrangements, the default BWP of each BWP group is defined according to a predefined rule, such as for example, defining a BWP with the lowest or largest first or second BWP index (e.g., the BWP index within the BWP group) as the default BWP of that BWP group.

In some arrangements, instead of the default BWP, the data can be transmitted and received on a BWP indicated in the DCI format. For example, the DCI includes another information field, e.g., a BWP indicator field. This field indicates a BWP of the BWPs belonging to the BWP group. In an example in which there are at most 2 BWPs within any BWP group, an BWP indicator field of 1 bit can be used to indicate one BWP from the 2 BWPs.

In some arrangements, all of the BWPs within the indicated BWP group will be activated. In some arrangements, some but not all of the BWPs within the indicated BWP group will be activated. In some examples, the activated BWP includes the BWP on which data transmission is scheduled (e.g., by the DCI). In some arrangements, two modes for activating the BWPs within the BWP group can be used. In a first mode, all of the BWPs within the indicated BWP group will be activated. In a second mode, some but not all of the BWPs within the indicated BWP group will be activated. In some examples, signaling (e.g., RRC signaling or MAC layer signaling) can be used to configure which mode is currently being employed.

In some arrangements in which the BWP group indicator field in the DCI indicates the currently active BWP group, the data scheduled by the DCI will be transmitted on the same BWP, and no switching occurs.

In some arrangements in which the BWP group indicator field in the DCI indicates the currently active BWP group, and the BWP indicator field in the DCI indicates an indicated active BWP different from the active BWP in the currently active BWP group, the data scheduled by the DCI will be transmitted on the indicated active BWP. For example, BWP group 1 is the currently active BWP group and includes active BWP #1 and BWP #2. The base station sends a DCI to the UE on BWP #1, where the BWP group indicator field of the DCI indicates BWP group #1 and the BWP indicator field of the DCI indicates BWP #2. Then, the data scheduled by the DCI will be transmitted on the BWP #2. As both BWP #1 and BWP #2 are currently active, no BWP or BWP group switching is triggered.

Accordingly, the dynamic switching operation in the unit of BWP group is defined, thus achieving the dynamic switching of multiple BWPs. At the same time, data scheduling indication in case of BWP group switching is also supported.

Some arrangements relate to RRC-based switching between different BWP groups.

Semi-static switching between different BWP groups may include for example RRC-based switching, timer-based switching, and so on.

For RRC-based switching, in some examples, a base station configures for a UE an indicated BWP (including at least one of an active downlink BWP and an active uplink BWP) group while the UE and the base station are communicating via a currently active BWP group. The configuration information sent by the base station to the UE via RRC signaling contains the BWP group index of the indicated BWP group to be activated upon performing the RRC configuration or RRC reconfiguration or other BWP group switch related RRC operations. In some examples in which the RRC signaling excludes the configuration information (e.g., the configuration information is absent from the RRC signaling), the RRC configuration or RRC reconfiguration or other BWP group switch related RRC operations does not impose a BWP group switch, and the UE and the base station continue to use the currently active BWP group for uplink and downlink communications.

In some examples, all of the BWPs in the indicated BWP group will be activated upon performing the RRC configuration or RRC reconfiguration or other BWP group switch related RRC operations. In some other examples, some but not all of the BWPs in the indicated active BWP group will be activated upon performing the RRC configuration or reconfiguration or other BWP group switch related RRC operations. For example, one or more default BWPs are defined or configured for the indicated BWP group. The default BWP(s) of the indicated BWP group is activated upon performing the RRC configuration or RRC reconfiguration or other BWP group switch related RRC operations. For example, in response to the UE receiving the configuration information containing the BWP group index for the indicated BWP group, the UE switches from the currently active BWP group to the indicated BWP group, and particularly, to the one or more default BWPs.

In some examples, the configuration information further contains the second BWP index of a BWP of the indicated BWP group. Then, this BWP will be activated upon performing the RRC configuration or reconfiguration or other BWP group switch related RRC operations. For example, in response to the UE receiving the configuration information containing the BWP group index for the indicated BWP group and the second BWP index of a BWP, the UE switches from the currently active BWP group to the indicated BWP group, and particularly, to the BWP identified by the second BWP index.

Accordingly, the RRC based semi-static switching operation in the unit of BWP group is defined, thus achieving the RRC based semi-static switching of multiple BWPs.

Some arrangements relate to with timer-based switching between different BWP groups.

For timer-based BWP group switching, in some examples, a base station configures for a UE a default BWP group while the UE and the base station are communicating via a currently active BWP group. The configuration information sent by the base station to the UE via RRC signaling contains the BWP group index of the default BWP group. If any default BWP group is absent from the configuration information, the BWP group that includes the initial BWP is the default BWP group.

In some examples, the base station determines a BWP group inactivity timer for a given BWP group. The base station can configure the BWP group inactivity timer to the UE via suitable signaling (e.g., RRC signaling). The UE resets the BWP group inactivity timer for the currently active BWP group in response to the UE detecting or receiving downlink data (e.g., a PDCCH or a MAC Protocol Data Unit (PDU)) in a configured downlink assignment on any BWP that belongs to the currently active BWP group. The base station likewise resets the BWP group inactivity timer for the currently active BWP group in response to sending downlink data (e.g., a PDCCH or a MAC PDU) in a configured downlink assignment on any BWP that belongs to the currently active BWP group. The UE and the base station will switch from the currently active BWP group to the default BWP group in response to determining the BWP group inactivity timer for the currently active BWP group is expired.

In some examples, the base station configures two or more BWP inactivity timers for a given BWP group. For instance, the base station can configure a BWP inactivity timer for each BWP within a BWP group. The UE resets the BWP inactivity timer for the currently active BWP in response to the UE detecting or receiving downlink data (e.g., a PDCCH or a MAC PDU) in a configured downlink assignment on the currently active BWP. The base station likewise resets the BWP inactivity timer for the currently active BWP in response to sending downlink data (e.g., a PDCCH or a MAC PDU) in a configured downlink assignment on the currently active BWP. The UE and the base station will switch from the currently active BWP group to the default BWP group in response to determining that the BWP group inactivity timer for every BWP in the currently active BWP group is expired.

In some examples, when the active BWP group switches to the default BWP group, all of the BWPs within the default BWP group are activated. In other examples, some but not all of the BWPs within the default BWP group will be activated. For example, one BWP within the default BWP group is defined/configured as the default BWP. In response to switching from the currently active BWP group to the default BWP group, at least one default BWP of the default BWP group will be activated while the rest of the BWPs remain inactive.

In some examples, a default BWP can be configured by base station. The configuration information contains the BWP index of the default BWP. If the configuration information is absent, the initial BWP will be the default BWP.

Then, if the timer(s) of the active BWP group is expired, the active BWP group will switch to the default BWP.

Accordingly, the timer-based semi-static switching operation in the unit of BWP group is defined, thus achieving the timer-based semi-static switching of multiple BWPs.

Various arrangements relate to coordinating and/or configuring concurrent services. For example, effectively configuring BWP groups can enable multiple BWPs to be activated simultaneously, at the same time. Further, the dynamic and semi-static switching operations in the unit of BWP group is defined, thus achieving the dynamic and semi-static switching of multiple BWPs. The disclosed mechanisms can also support data scheduling indication in case of BWP group switching.

Figure 6:
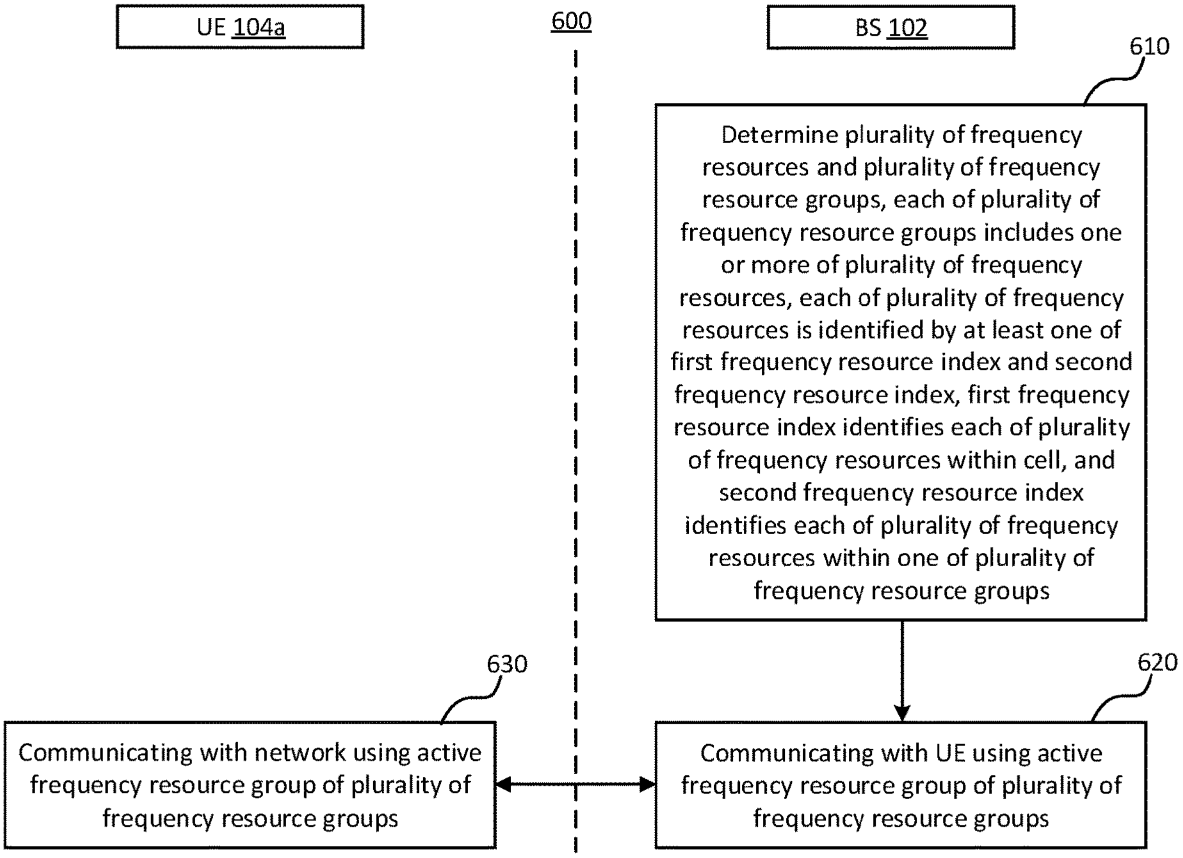
FIG. 6 is a flowchart diagram illustrating an example method for managing frequency resource group based service transmissions, according to various arrangements.

FIG. 6 is a flowchart diagram illustrating an example method 600 for managing frequency resource group based service transmissions, according to various arrangements. Referring to FIGS. 1-6, the method 600 can be performed by the network (e.g., the BS 102) and the UE 104*a*.

At 610, the network (e.g., the BS 102 corresponding to a cell) determines for a cell a plurality of frequency resources and a plurality of frequency resource groups. Each of the plurality of frequency resource groups includes one or more of the plurality of frequency resources. Each of the plurality of frequency resources is identified by at least one of a first frequency resource index or a second frequency resource index. The first frequency resource index (e.g., the first BWP index) identifies each of the plurality of frequency resources within the cell. The second frequency resource index (e.g., the second BWP index) identifies each of the plurality of frequency resources within one of the plurality of frequency resource groups.

In some arrangements, each of the plurality of frequency resources comprises a BWP. Each of the plurality of frequency resource groups is a BWP group.

At 620, the network (e.g., the BS 102) communicates with a wireless communication device (e.g., the UE 104*a*) using an active frequency resource group of the plurality of frequency resource groups. At 630, the UE 104*a* communicates with the network using the active frequency resource group of the plurality of frequency resource groups. Prior to communicating with the network, the UE 104*a* receives from the network the first frequency resource index and/or the second frequency resource index.

In some arrangements, the method 600 further includes sending, by the network (e.g., the BS 102) to the wireless communication device (e.g., the UE 104*a*), a frequency resource group indicator indicating switching from the active frequency resource group to an indicated frequency resource group. The UE 104*a* receives the frequency resource group indicator. In response, the BS 102 switches from the active frequency resource group to the indicated frequency resource group for communicating with the UE 104*a*, and the UE 104*a* switches from the active frequency resource group to the indicated frequency resource group for communicating with the BS 102.

In some arrangements, the frequency resource group indicator is in a frequency resource group indicator field of DCI. For example, the DCI schedules data in at least one of uplink or downlink. The method further includes communicating, by the network with the UE 104*a*, the data using a default frequency resource in the indicated frequency resource group. The method further includes communicating, by the UE 104*a* with the network, the data using a default frequency resource in the indicated frequency resource group.

In addition, for example, the DCI schedules data in at least one of uplink or downlink, and the method further includes communicating, by the network with the UE 104*a*, the data using a frequency resource in the indicated frequency resource group as indicated by a frequency resource indicator field of the DCI. The method further includes communicating, by the UE 104*a* with the network, the data using a frequency resource in the indicated frequency resource group as indicated by a frequency resource indicator field of the DCI.

In some arrangements, the method 600 further includes sending, by the network to the U, configuration information (e.g., of RRC signaling) identifying an indicated frequency resource group of the plurality of frequency resource groups. The UE 104*a* receives from the network the configuration. In response, the network switches from the active frequency resource group to the indicated frequency resource group after or in response to RRC configuration or RRC reconfiguration to communicate with the UE 104*a*, and the UE switches from the active frequency resource group to the indicated frequency resource group after or in response to RRC configuration or RRC reconfiguration to communicate with the network.

In some arrangements, the active frequency resource group is identified by a first frequency resource group index (e.g., first BWP group index). The indicated frequency resource group is identified by a second frequency resource group index (e.g., a second BWP group index). The configuration information includes the second frequency resource group index In some arrangements, the method 600 further includes sending, by the network to the UE 104*a*, a frequency resource group inactivity timer (e.g., a BWP group inactivity timer) for the active frequency resource group. The UE 104*a* receives the frequency resource group inactivity timer from the network. The network switches from the active frequency resource group to a default frequency resource group for communicating with the UE 104*a* in response to the frequency resource group inactivity timer expiring. The UE 104*a* switches from the active frequency resource group to the default frequency resource group for communicating with the network in response to the frequency resource group inactivity timer expiring.

In some arrangements, the method 600 further includes sending, by the network to the UE 104*a*, a frequency resource inactivity timer (e.g., a BWP inactivity timer) for each of at least one frequency resource of the active frequency resource group. In response, the network switches from the active frequency resource group to a default frequency resource group for communicating with the UE 104*a* in response to the frequency resource inactivity timers for all of the at least one frequency resource of the active frequency resource group expiring (e.g., in response to all frequency resource inactivity timers associated with all frequency resources of the active frequency resource group expiring). The UE 104*a* switches from the active frequency resource group to the default frequency resource group for communicating with the network in response to the frequency resource inactivity timers for all of the at least one frequency resource of the active frequency resource group expiring.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is further understood by those within the art that if a specific number of an introduced claim recitation is intended, such an intent is explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to the disclosure containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It is further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" is understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the disclosure be defined by the claims appended hereto and their equivalents.

The invention claimed is:

1. A wireless communication method, comprising:
determining, by a network for a cell, a plurality of frequency resources and a plurality of frequency resource groups, each of the plurality of frequency resource groups comprises one or more of the plurality of frequency resources, wherein each of the plural of frequency resources is identified by at least one of a first frequency resource index and a second frequency resource index, the first frequency resource index identifies each of the plurality of frequency resources within the cell, and the second frequency resource index identifies each of the plurality of frequency resources within one of the plurality of frequency resource groups, wherein the first frequency resource index and the second frequency resource index are different; and
communicating, by the network with a wireless communication device, using an active frequency resource group of the plurality of frequency resource groups.

2. The method of claim 1, wherein
each of the plurality of frequency resources comprises a Bandwidth Part (BWP); and
each of the plurality of frequency resource groups is a BWP group.

3. The method of claim 1, further comprising:
sending, by the network to the wireless communication device, a frequency resource group indicator indicating switching from the active frequency resource group to an indicated frequency resource group; and
switching, by the network, from the active frequency resource group to the indicated frequency resource group for communicating with the wireless communication device.

4. The method of claim 3, wherein the frequency resource group indicator is in a frequency resource group indicator field of Downlink Control Information (DCI).

5. The method of claim 4, wherein
the DCI schedules data in at least one of uplink or downlink; and
communicating, by the network with the wireless communication device, the data using a default frequency resource in the indicated frequency resource group.

6. The method of claim 4, wherein
the DCI schedules data in at least one of uplink or downlink; and
communicating, by the network with the wireless communication device, the data using a frequency resource in the indicated frequency resource group as indicated by a frequency resource indicator field of the DCI.

7. The method of claim 1, further comprising:
sending, by the network to the wireless communication device, configuration information identifying an indicated frequency resource group of the plurality of frequency resource groups; and
switching, by the network, from the active frequency resource group to the indicated frequency resource group after RRC configuration or RRC reconfiguration.

8. The method of claim 7, wherein
the active frequency resource group is identified by a first frequency resource group index;
the indicated frequency resource group is identified by a second frequency resource group index; and
the configuration information comprises the second frequency resource group index.

9. The method of claim 1, further comprising:
sending, by the network to the wireless communication device, a frequency resource group inactivity timer for the active frequency resource group; and
switching, by the network, from the active frequency resource group to a default frequency resource group for communicating with the wireless communication device in response to the frequency resource group inactivity timer expiring.

10. The method of claim 1, further comprising:
sending, by the network to the wireless communication device, a frequency resource inactivity timer for each of at least one frequency resource of the active frequency resource group; and
switching, by the network, from the active frequency resource group to a default frequency resource group for communicating with the wireless communication device in response to the frequency resource inactivity timers for all of the at least one frequency resource of the active frequency resource group expiring.

11. A network node, comprising:
at least processor configured to:
determine, for a cell, a plurality of frequency resources and a plurality of frequency resource groups, each of the plurality of frequency resource groups comprises one or more of the plurality of frequency resources, wherein each of the plurality of frequency resources is identified by at least one of a first frequency resource index and a second frequency resource index, the first frequency resource index identifies each of the plurality of frequency resources within the cell, and the second frequency resource index identifies each of the plurality of frequency resources within one of the plurality of frequency resource groups, wherein the first frequency resource index and the second frequency resource index are different; and
communicate, via an interface with a wireless communication device, using an active frequency resource group of the plurality of frequency resource groups.

12. A wireless communication device, comprising:
at least processor configured to:
communicating, via an interface, with a network of a cell, using an active frequency resource group of a plurality of frequency resource groups,
wherein each of the plurality of frequency resource groups comprises one or more of a plurality of frequency resources,
wherein each of the plurality of frequency resources is identified by at least one of a first frequency resource index and a second frequency resource index, the first frequency resource index identifies each of the plurality of frequency resources within the cell, and the second frequency resource index identifies each of the plurality of frequency resources within one of the plurality of frequency resource groups, wherein the first frequency resource index and the second frequency resource index are different.

13. A wireless communication method, comprising:

communicating, by a wireless communication device with a network of a cell, using an active frequency resource group of a plurality of frequency resource groups, wherein each of the plurality of frequency resource groups comprises one or more of a plurality of frequency resources, wherein each of the plurality of frequency resources is identified by at least one of a first frequency resource index and a second frequency resource index, the first frequency resource index identifies each of the plurality of frequency resources within the cell, and the second frequency resource index identifies each of the plurality of frequency resources within one of the plurality of frequency resource groups, wherein the first frequency resource index and the second frequency resource index are different.

14. The method of claim 13, wherein each of the plurality of frequency resources comprises a Bandwidth Part (BWP); and each of the plurality of frequency resource groups is a BWP group.

15. The method of claim 13, further comprising:

receiving, by the wireless communication device from the network, a frequency resource group indicator indicating switching from the active frequency resource group to an indicated frequency resource group; and switching, by the wireless communication device, from the active frequency resource group to the indicated frequency resource group for communicating with the network.

16. The method of claim 15, wherein the frequency resource group indicator is in a frequency resource group indicator field of Downlink Control Information (DCI).

17. The method of claim 16, wherein the DCI schedules data in at least one of uplink or downlink; and communicating, by the wireless communication device with the network, the data using a default frequency resource in the indicated frequency resource group.

18. The method of claim 16, wherein the DCI schedules data in at least one of uplink or downlink; and communicating, by the wireless communication device with the network, the data using a frequency resource in the indicated frequency resource group as indicated by a frequency resource indicator field of the DCI.

19. The method of claim 13, further comprising:

receiving, by the wireless communication device from the network, configuration information identifying an indicated frequency resource group of the plurality of frequency resource groups; and switching, by the wireless communication device, from the active frequency resource group to the indicated frequency resource group after RRC configuration or RRC reconfiguration.

20. The method of claim 19, wherein the active frequency resource group is identified by a first frequency resource group index;

the indicated frequency resource group is identified by a second frequency resource group index;

the configuration information comprises the second frequency resource group index.

* * * * *